United States Patent
Son et al.

(10) Patent No.: US 9,190,656 B2
(45) Date of Patent: Nov. 17, 2015

(54) CATHODE CURRENT COLLECTOR FOR ELECTRICAL ENERGY STORAGE DEVICE AND METHOD FOR MANUFACTURING THE SAME

(75) Inventors: Sam Ick Son, Gyeonggi-do (KR); Hee Yeon Ryu, Gyeonggi-do (KR); Dae Gun Jin, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 982 days.

(21) Appl. No.: 13/348,162

(22) Filed: Jan. 11, 2012

(65) Prior Publication Data

US 2013/0101902 A1   Apr. 25, 2013

(51) Int. Cl.
*H01M 4/66* (2006.01)
*H01M 4/62* (2006.01)
*H01M 4/13* (2010.01)

(52) U.S. Cl.
CPC .............. *H01M 4/13* (2013.01); *H01M 4/661* (2013.01); *H01M 4/667* (2013.01); *Y02E 60/122* (2013.01)

(58) Field of Classification Search
CPC ....... H01M 4/13; H01M 4/661; H01M 4/667; Y02E 60/122
See application file for complete search history.

(56) References Cited

U.S. PATENT DOCUMENTS

2010/0298135 A1*  11/2010  Dionne et al. ................ 502/439
2011/0272288 A1*  11/2011  Lin ................................ 205/205

FOREIGN PATENT DOCUMENTS

| JP | 08255610 A | 10/1996 |
|---|---|---|
| JP | 2000314714 A | 11/2000 |
| JP | 2005183150 A | 7/2005 |
| JP | 2008098590 A * | 4/2008 |
| KR | 10-2005-0035734 | 4/2005 |
| KR | 10-2006-0042144 | 5/2006 |
| KR | 10-0856746 B1 | 8/2008 |
| KR | 100856746 B1 | 8/2008 |
| KR | 10-2010-0101885 | 9/2010 |
| KR | 10-2010-0131921 | 12/2010 |
| KR | 10-2011-0049471 | 5/2011 |
| KR | 1020110049471 A | 5/2011 |

* cited by examiner

*Primary Examiner* — Carlos Barcena
(74) *Attorney, Agent, or Firm* — Mintz Levin Cohn Ferris Glovsky and Popeo, P.C.; Peter F. Corless

(57) ABSTRACT

Disclosed is a cathode current collector for an electrical energy storage device and a method for manufacturing the same, which improves adhesion between a current collector and an electrode material and provide a high reaction surface area, thereby improving the performance of the electrical energy storage. In particular, a first alumina film is formed on the surface of an aluminum foil using an anodic oxidation process. Next, the first alumina film formed on a surface of the aluminum foil is removed through etching and a second alumina film is formed on the surface of the aluminum foil, from which the first alumina film is removed, using the anodic oxidation process again. Subsequently, a carbon layer is coated on a surface of the aluminum foil on which the second alumina film is formed.

3 Claims, 3 Drawing Sheets

CATHODE CURRENT COLLECTOR FOR ELECTRICAL ENERGY STORAGE DEVICE AND METHOD FOR MANUFACTURING THE SAME

CROSS-REFERENCE TO RELATED APPLICATION

This application claims under 35 U.S.C. §119(a) the benefit of Korean Patent Application No. 10-2011-0107558 filed Oct. 20, 2011, the entire contents of which are incorporated herein by reference.

BACKGROUND (a) Technical Field

The present invention relates to a cathode current collector for an electrical energy storage device. More particularly, it relates to a cathode current collector for an electrical energy storage device and a method for manufacturing the same, which can improve the adhesion between a current collector and an electrode material and provide a high reaction surface area, thereby improving the performance of the electrical energy storage.

(b) Background Art

An electrical energy storage device is a device that generates electrical energy between electrodes. Typically, an electrode is formed by coating an electrode slurry on a current collector, and the electrode slurry is prepared by mixing an electrode material, which includes an electrode active material for storing energy, a conductive material for imparting electrical conductivity, and a binder for binding the conductive material to the current collector and providing a bonding force between them, with a solvent.

The current collector functions to accumulate electrons generated by an electrochemical reaction of the active material and transfers the electrons to an external circuit in the electrical energy storage device such as a battery, an electrochemical capacitor, etc. In order to accommodate the electrons produced in the active material as much as possible, the current collector must be strongly bonded to the active material and have a higher contact area. Moreover, the current collector is required to have high electrical conductivity so as to smoothly transfer the electrons emitted from the active material to the external circuit.

However, the electrode material and the current collector in conventional electrodes have a limited contact area, and thus the adhesion between the electrode material and the current collector is reduced. As a result, the electrode material attached to the surface of the current collector is removed during operation of the electrical energy storage device. The reduction in the adhesion and the removal of the electrode material increases the internal resistance of the electrical energy storage device, which degrades the output characteristics and reduces the charge capacity, thereby significantly degrading the performance of the electrical energy storage device.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a cathode current collector for an electrical energy storage device and a method for manufacturing the same, which can improve the surface structure of the cathode current collector by an anodic oxidation process to increase the reaction surface area. Furthermore, the cathode current collector of the present invention improves the electrical conductivity and the adhesion with a cathode active material by coating a conductive carbon layer on the surface of the cathode current collector.

In one aspect, the present invention provides a method for manufacturing a cathode current collector, the method comprising: forming a first alumina film on the surface of an aluminum foil by an anodic oxidation process; removing the first alumina film formed on the surface of the aluminum foil by etching; forming a second alumina film on the surface of the aluminum foil, from which the first alumina film is removed, by the anodic oxidation process; and coating a carbon layer on the surface of the aluminum foil on which the second alumina film is formed.

In an exemplary embodiment, the method may further comprise, prior to forming the second alumina film, washing the aluminum foil, from which the first alumina film is removed, with deionized water and drying the resulting aluminum foil in a preheated oven.

In another aspect, the present invention provides a cathode current collector for an electrical energy storage device, the cathode current collector comprising: an aluminum foil layer having a high specific surface area on which an alumina film having a nanoporous structure is formed; and a conductive carbon layer coated on the surface of the aluminum foil layer.

In still another aspect, the present invention provides a method for manufacturing a cathode for an electrical energy storage device, the method comprising: forming a first alumina film on the surface of an aluminum foil by an anodic oxidation process; removing the first alumina film formed on the surface of the aluminum foil by etching; forming a second alumina film on the surface of the aluminum foil, from which the first alumina film is removed, by the anodic oxidation process; coating a carbon layer on the surface of the aluminum foil on which the second alumina film is formed; and coating a cathode slurry on the surface of the carbon layer.

In yet another aspect, the present invention provides a cathode for an electrical energy storage device, the cathode comprising: a cathode current collector including an aluminum foil layer having a high specific surface area, on which an alumina film having a nanoporous structure is formed, and a conductive carbon layer coated on the surface of the aluminum foil layer; and a cathode material layer coated on the surface of the cathode current collector. More specifically, the cathode material layer coated on the surface of the cathode current collector includes a cathode active material, a conductive material, and a binder.

In still yet another aspect, the present invention provides an electrical energy storage device including a cathode having a cathode current collector with an aluminum foil layer having a high specific surface area, on which an alumina film having a nanoporous structure is formed, and a conductive carbon layer coated on the surface of the aluminum foil layer; and a cathode material layer coated on the surface of the cathode current collector where the cathode material layer includes a cathode active material, a conductive material, and a binder.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
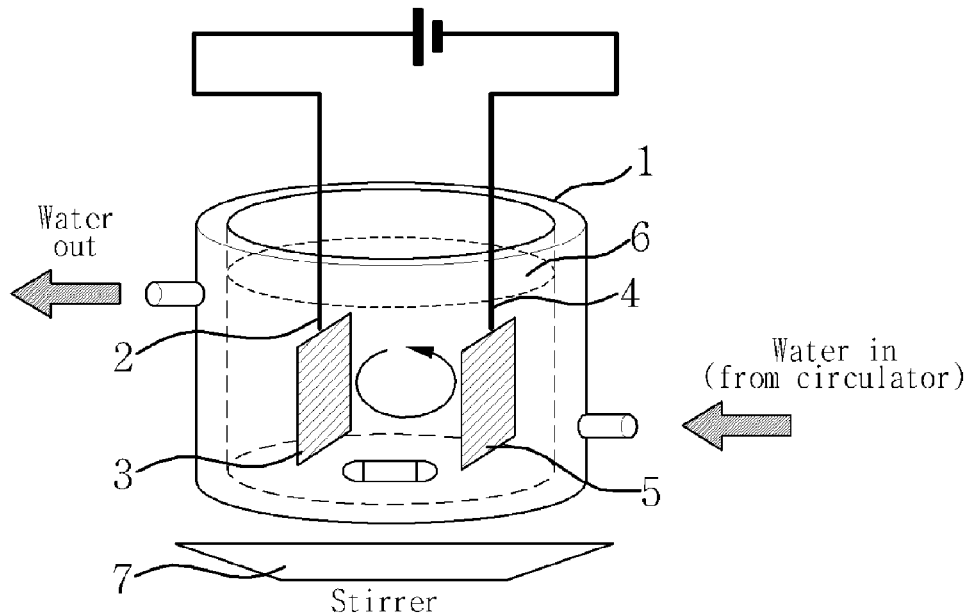
FIG. 1 is schematic diagram showing an anodic oxidation process using an electrochemical device.

Reference numerals set forth in the Drawings includes reference to the following elements as further discussed below:

1: electrolyzer
2: anode electrode
3: aluminum foil
4: counter electrode
5: platinum foil
6: electrolyte
7: stirrer
10: aluminum foil layer
11: alumina film
12: carbon layer
13: cathode current collector
14: cathode material layer
15: cathode It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention provides a cathode current collector and a method for manufacturing the same, which improves the surface structure of the cathode current collector to increase the reaction surface area, in which a nano-honeycomb structure is formed on the surface of the current collector by an anodic oxidation process such as an aluminum anodic oxide (AAO) process, thereby increasing the specific surface area.

When the surface area of the current collector increases, the surface area to which an electrode material is attached also increases, which in turn improves the adhesion between the electrode material and the current collector and further increases the surface area of the electrode material, thereby increasing the reaction surface area of the electrical energy storage device. As such, when the surface area of the current collector increases, it is possible to increase the contact area between the electrode material and the current collector without changing components of the electrode material, thereby increasing the reaction surface area.

When the anodic oxidation process is used, it is possible to control the pore size and depth on the surface of the current collector by changing the time and conditions of the anodic oxidation, and thus it is possible to control the pore size of the nano-honeycomb structure from several nanometers to several hundred nanometers and the pore depth to several hundred micrometers with low-cost equipment.

According to the illustrative embodiment of the present invention, an alumina film having a high specific surface area with a nanoporous structure (e.g., nano-honeycomb structure) is formed on the surface of the current collector by anodically oxidizing an aluminum current collector, and the surface of the alumina film is coated with a conductive carbon material, thereby manufacturing a cathode current collector.

A carbon layer formed on the surface of the alumina film improves the electrical conductivity of the current collector, prevents the aluminum current collector from being damaged by an electrolyte of the electrical energy storage device, and improves adhesion with a cathode material.

FIG. 1 is schematic diagram showing an anodic oxidation process using an electrochemical device. An aluminum foil 3 to be anodically oxidized is connected to an anode electrode 2 in an electrolyzer 1 containing an electrolyte 6 such as oxalic acid, phosphoric acid, sulfuric acid, etc., and a platinum foil 5 is connected to a counter electrode 4.

The electrolyte 6 is continuously stirred with a stirrer 7 to prevent a local increase in the concentration of the electrolyte, and the aluminum foil 3 is anodically oxidized by electrolysis, thereby forming an alumina film having a hexagonal structure such as a nano-honeycomb structure on the surface of the aluminum foil 3. The alumina film formed on the surface of the aluminum foil 3 is a porous film having a honeycomb structure with a plurality of pores, and the pore size and depth of the alumina film may be controlled by changing the etching conditions of the alumina film. Otherwise, the size and the distance between the pores may be controlled by the type of the electrolyte. That is, the nanoporous structure formed on the surface of the aluminum foil during anodic oxidation may be controlled by the type of the electrolyte and/or by the change of the etching conditions.

Typically, the size and depth of the pores formed on the surface of the aluminum foil during anodic oxidation are proportional to the length of time the anodic oxidation process is applied and the distance between the pores is proportional to the voltage applied during the anodic oxidation process.

In the illustrative embodiment of the present invention, the pore size and depth on the surface of the aluminum foil, i.e., the current collector, are proportional to the time of a second anodic oxidation process. In detail, during manufacturing the anodic current collector of the present invention, the alumina film formed during the first anodic oxidation process has an irregular porous structure. Thus, the first formed alumina film is removed by an etching process, and thus a second anodic oxidation process is performed to form a uniform nanoporous second alumina film on the surface of the current collector.

That is, in order to form a uniform nanoporous surface structure on the current collector, the alumina film formed by the first anodic oxidation process is removed by the etching process, and the second anodic oxidation process is performed to form a nano-honeycomb structure having a regular and uniform surface. Therefore, in the illustrative embodiment of the present invention, the pore size and the surface depth of the pores on the current collector are proportional to the length of time the second anodic oxidation process is applied.

After the anodic oxidation process, a non-conductive alumina film is formed on the surface of the current collector, and thus a carbon material having a high specific surface area is coated on the surface of the current collector using a plasma coater to form a conductive carbon layer, thereby providing electrical conductivity. The carbon layer on the surface of the current collector provides electrical conductivity to the current collector, prevents corrosion of the current collector, and improves adhesion with the electrode material.

Figure 5:
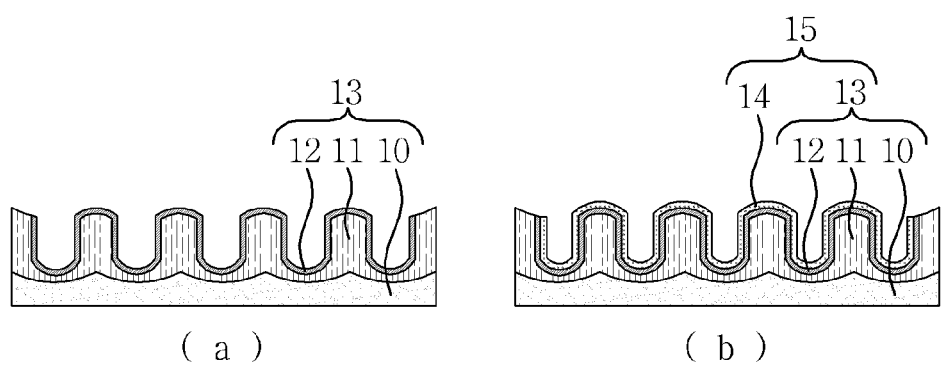
FIG. 5 is a schematic diagram showing the cross-sectional structures of a cathode current collector and a cathode in accordance with the illustrative embodiment of the present invention.

Referring to FIG. 5, the anodic current collector formed by the above-described processes comprises an aluminum foil layer 10 having a high specific surface area, on which an alumina film 11 having a nano-honeycomb structure is formed, and a carbon layer 12 having a high specific surface area and coated on the surface of the aluminum foil layer 10.

Next, the following examples illustrate the invention and are not intended to limit the same.

EXAMPLE 1

Manufacture of Anodic Current Collector

First, an anodic oxidation process was performed using an electrochemical device as shown in FIG. 1.

An aluminum foil was connected to an anode electrode (i.e., a positive electrode) of the electrochemical device, and a platinum foil was connected to a counter electrode. In order to maintain the potential between the two electrodes at a constant level, the distance between the aluminum foil and the platinum foil was maintained at 50 mm A constant voltage was supplied from a power supply between the two electrodes to induce an anodic oxidation reaction at a constant temperature, and an electrolyte was continuously stirred with a stirrer to prevent a local increase in the concentration of the electrolyte.

A 1 M phosphoric acid solution was used as the electrolyte in a first anodic oxidation process, and a voltage of 40 V was applied between the two electrodes to induce electrolysis such that the surface of the aluminum foil was oxidized, thereby forming a first alumina film. Then, the first alumina film formed on the surface of the aluminum foil was removed by etching using a mixed solution of chromic acid and phosphoric acid at 65° C., thereby forming a uniform surface structure. Here, the mixed solution was prepared by mixing 1.8 wt % of chromic acid, 6 wt % of phosphoric acid, and 92.2 wt % of $HgCl_2$. Subsequently, the resulting aluminum foil was washed with deionized water for about 15 minutes and dried in a preheated oven at 60° C. for about 1 hour.

In a second anodic oxidation process, a 1 M phosphoric acid solution was used as the electrolyte, and a voltage of 165 V was applied between the two electrodes to perform electrolysis for about 100 minutes such that the surface of the aluminum foil, from which the first alumina film was removed, was oxidized, thereby forming a second alumina film. Here, the temperature of the electrolyzer was maintained at 2° C. The second alumina film formed on the surface of the aluminum foil by the above-described process had an aluminum anodic oxide structure in which pores had a diameter of 100 nm and a depth of 3 μm and the distance between the pores was about 180 nm.

A conductive carbon layer was coated on the surface of the aluminum foil having the aluminum anodic oxide structure (i.e., the alumina film) using a plasma coater. Graphite having a high specific surface area was used as a carbon source, and a high voltage was applied between the anodically oxidized current collector (i.e., the aluminum foil) and a target to produce carbon plasma, thereby forming the carbon layer with a thickness of several nm on the surface of the current collector.

EXAMPLE 1

Manufacture of Cathode

Figure 2:
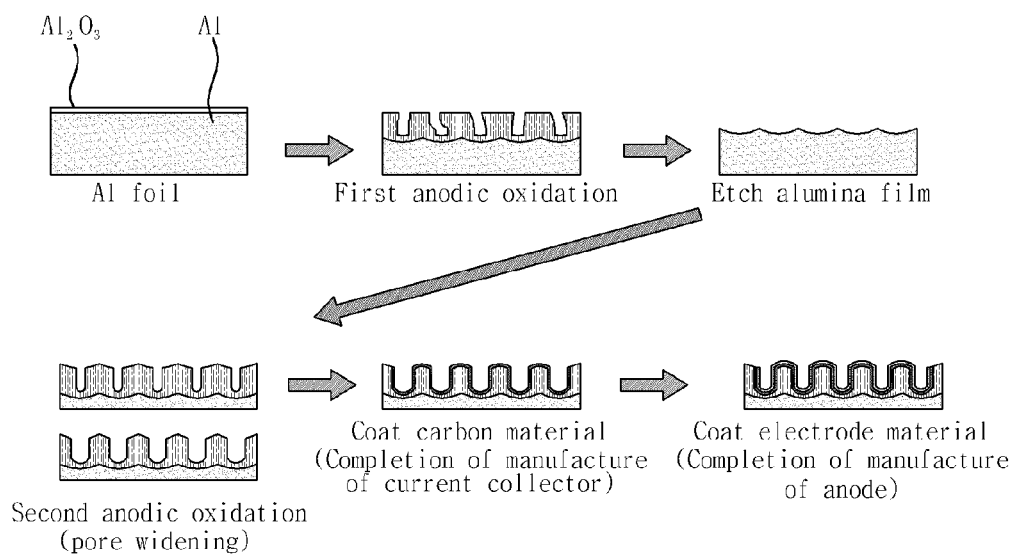
FIG. 2 is a schematic diagram sequentially showing the steps of a method for manufacturing a cathode current collector for an electrical energy storage device in accordance with an illustrative embodiment of the present invention, in which an aluminum current collector having a high specific surface area is manufactured by an aluminum anodic oxide (AAO) process.

A cathode slurry (or cathode material) was prepared by mixing 60 wt % of sulfur having a particle size of 100 mesh as a cathode active material, 20 wt % of Super C as a conductive material, and 20 wt % of polyvinyliden fluoride (PVDF) as a binder. The prepared cathode slurry was coated on the surface of the cathode current collector (on which the carbon layer was coated) formed in Example 1 to form a cathode. The process of manufacturing the cathode including the process manufacturing of the cathode current collector as described in Examples 1 and 2 can be shown in FIG. 2.

EXAMPLE 3

Manufacture of Lithium-Sulfur Battery

The cathode formed in Example 2 was used as a cathode, and a liquid electrolyte prepared by dissolving LiTFSI with a concentration of 1 M in TEGDME/DIOX mixed in a volume ratio of 5:5 was used as an electrolyte. A lithium-sulfur battery was manufactured using a lithium foil cathode with a thickness of 200 μm. As a result of a peel-off test, the adhesion between the cathode current collector of Example 1 and the cathode slurry (i.e., the cathode material) was higher than that of a typical current collector made of aluminum foil.

Figure 4:
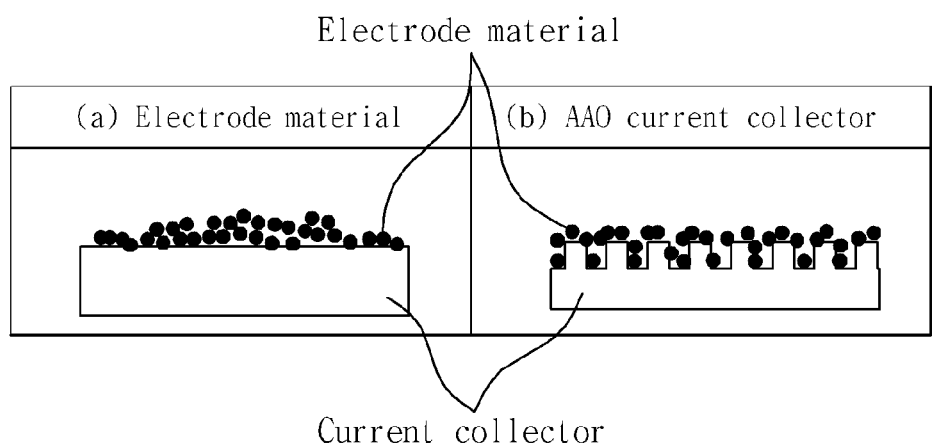
FIG. 4 is a schematic diagram showing the specific surface area of a cathode current collector in accordance with the illustrative embodiment of the present invention and that of an existing cathode current collector.

The surface area of the current collector manufactured in the above manner is increased to in turn increase the reaction area (see FIG. 4), which in turn improves the adhesion between the electrode material and the current collector, thereby improving the performance of the electrical energy storage device.

As shown in FIG. 5, the cathode 15 manufactured by the above-described process includes: a cathode current collector 13 including an aluminum foil layer 10 having a high specific surface area, on which an alumina film 11 having a nanoporous structure is formed, and a conductive carbon layer 12 having a high specific surface area and coated on the surface of the aluminum foil layer 10; and a cathode material layer 14 coated on the surface of the cathode current collector 13. This cathode material layer 14 includes a cathode active material, a conductive material, and a binder.

Moreover, the electrical energy storage device manufactured by the above-described process includes a first cathode 15 having a cathode current collector 13, which includes an aluminum foil layer 10 having a high specific surface area, on which an alumina film 11 having a nanoporous structure is formed, and a conductive carbon layer 12 having a high specific surface area and coated on the surface of the aluminum foil layer 10, and a cathode material layer 14 coated on the surface of the cathode current collector 13. Again the cathode material layer includes a cathode active material, a conductive material, and a binder. The electrical energy storage device also includes a second cathode (not shown) formed of a cathode slurry containing a cathode active material; and an electrolyte.

Figure 3:
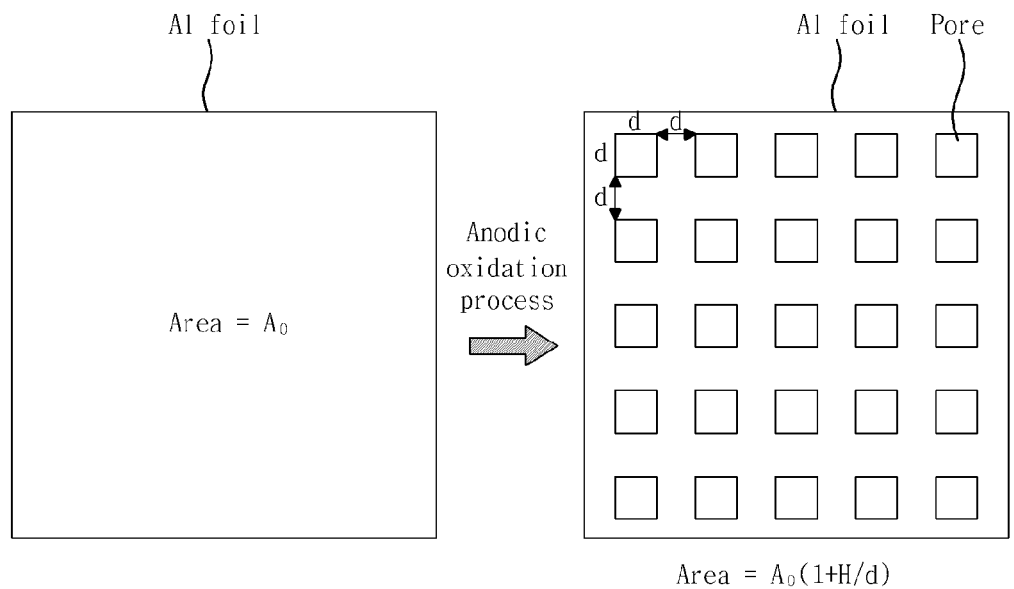
FIG. 3 is a schematic diagram showing the calculation of a gain in surface area due to a nanoporous structure formed on the surface of a cathode current collector in accordance with the illustrative embodiment of the present invention.

Meanwhile, in the case of the aluminum anodic oxide structure formed on the surface of the cathode current collector, a gain in surface area is achieved depending on the pore size and depth of the alumina film, which can be calculated using a simple schematic model shown in FIG. 3. If the surface area of the current collector before the aluminum anodic oxide process is $A_0$ and if a plurality of square pores with a length of d and a height of H are formed at an interval of d on the surface of the current collector, the surface area A can be calculated as follows:

Surface area $A = A_0 * (1 + H/d)$

Therefore, if a plurality of pores with a diameter of 100 nm and a depth of 3 μm are formed at an interval of 180 nm on the surface of the current collector, the gain in surface area due to the anodic oxidation reaches about 31 times.

As described above, the method for manufacturing the cathode current collector according to the present invention increases the specific surface area of the cathode current collector to in turn increase the contact area between the current collector and the electrode material, which in turn improves the adhesion between the electrode material and the current collector and further provides a high reaction surface area, thereby improving the performance of the electrical energy storage. Moreover, the cathode current collector according to the present invention increases electrical conductivity by the carbon layer coated on the surface thereof, prevents corrosion of the aluminum current collector due to the electrolyte, and improves adhesion with the electrode material.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A cathode current collector for an electrical energy storage device, the cathode current collector comprising:
   an aluminum foil layer on which an alumina film having a nanoporous structure is formed; and
   a conductive carbon layer coated on a surface of the aluminum foil layer,
   wherein the nanoporous structure is a nano-honeycomb structure,
   wherein the conductive carbon layer is comprised of a graphite.

2. A cathode for an electrical energy storage device, the cathode comprising:
   a cathode current collector including an aluminum foil layer, on which an alumina film having a nanoporous structure is formed, and a conductive carbon layer coated on a surface of the aluminum foil layer; and
   a cathode material layer coated on a surface of the cathode current collector, the cathode material layer including a cathode active material, a conductive material, and a binder,
   wherein the nanoporous structure is a nano-honeycomb structure,
   wherein the conductive carbon layer is comprised of a graphite.

3. An electrical energy storage device comprising a cathode, the cathode including:
   a cathode current collector having an aluminum foil layer, on which an alumina film with a nanoporous structure is formed, and a conductive carbon layer coated on a surface of the aluminum foil layer; and
   a cathode material layer coated on a surface of the cathode current collector, the cathode material layer including a cathode active material, a conductive material, and a binder,
   wherein the nanoporous structure is a nano-honeycomb structure,
   wherein the conductive carbon layer is comprised of a graphite.

* * * * *